United States Patent [19]

Sugita et al.

[11] Patent Number: 5,361,349
[45] Date of Patent: Nov. 1, 1994

[54] VIRTUAL OBJECT MANAGEMENT SYSTEM FOR MANAGING VIRTUAL OBJECTS WHICH CORRESPOND TO REAL OBJECTS UNDER A USER DEFINED HIERARCHY

[75] Inventors: Yumiko Sugita, Musashino; Hisashi Hashimoto; Masaki Tsuruki, both of Yokohama; Seiichi Domyo, Tanashi, all of Japan

[73] Assignee: Hitachi, Ltd., Tokyo, Japan

[21] Appl. No.: 796,575

[22] Filed: Nov. 22, 1991

[30] Foreign Application Priority Data

Nov. 27, 1990 [JP] Japan .................................. 2-323802

[51] Int. Cl.$^5$ ............................................. G06F 15/40
[52] U.S. Cl. ................................... 395/600; 395/157;
395/160; 395/700; 364/DIG. 1; 364/282.3; 364/283.1
[58] Field of Search ............... 395/155, 157, 159, 160, 395/600, 700

[56] References Cited

U.S. PATENT DOCUMENTS

| | | | |
|---|---|---|---|
| 4,791,556 | 12/1988 | Vilkaitis | 395/159 |
| 5,001,628 | 3/1991 | Johnson et al. | 395/600 |
| 5,012,405 | 4/1991 | Nishikado et al. | 395/608 |
| 5,142,674 | 8/1992 | Barker et al. | 395/600 |

OTHER PUBLICATIONS

Sakamura et al., "An Overview of the BTRON/286 Specification", *IEEE Micro*, 1989, pp. 14-25.
Venkatramani et al., "Using Configured Directories to Solve Software Maintenance Problems", 1988 IEEE pp. 172-177.

*Primary Examiner*—Paul V. Kulik
*Assistant Examiner*—John C. Loomis
*Attorney, Agent, or Firm*—Fay, Sharpe, Beall, Fagan, Minnich & McKee

[57] ABSTRACT

An object management system is equipped with a single real object management system for managing a real file object such as data and a program based on a real directory object in a hierarchical structure, and also at least a single virtual object management system for managing a virtual file object corresponding to said file object based upon a virtual directory object which is independent of the directory object in a hierarchical structure.

6 Claims, 19 Drawing Sheets

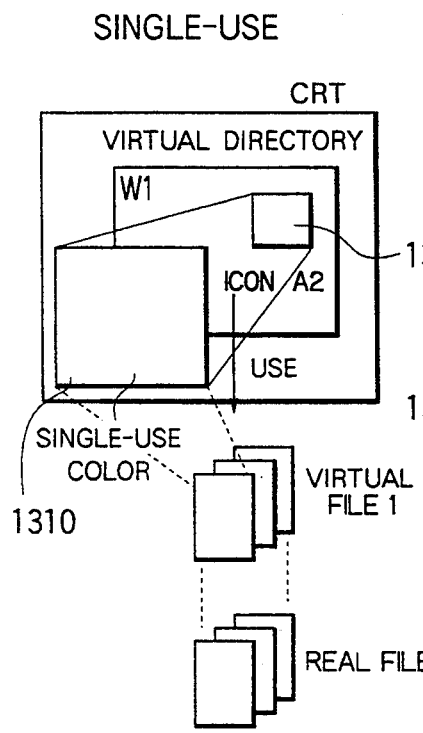
FIG. 4A
SINGLE-USE
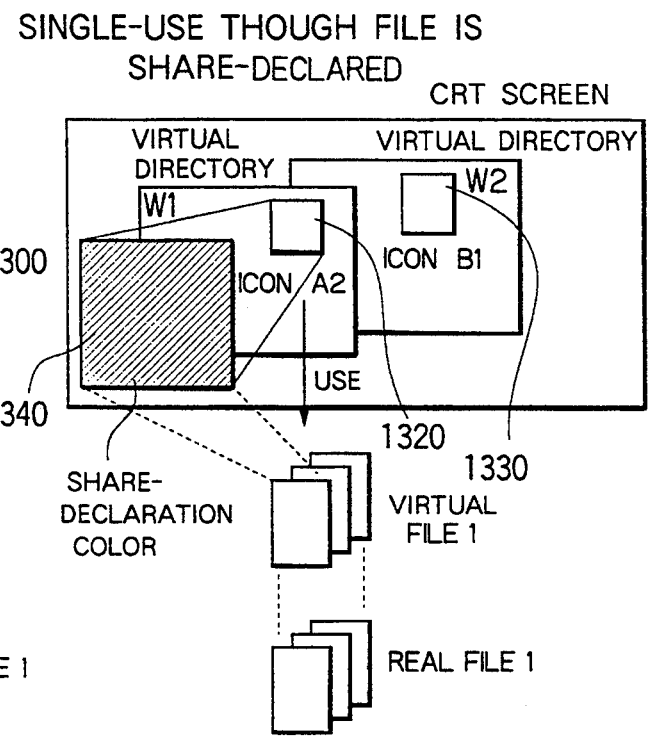
FIG. 4B
SINGLE-USE THOUGH FILE IS SHARE-DECLARED
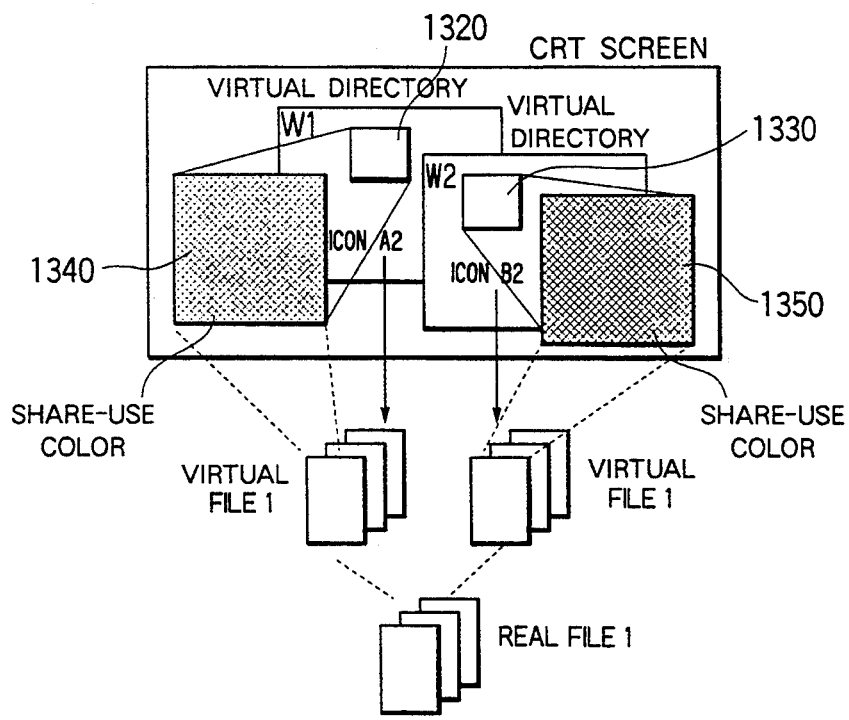
FIG. 4C  SHARE-USE FIG. 5A  CONSTRUCTION OF VIRTUAL OBJECT MANAGEMENT TABLE
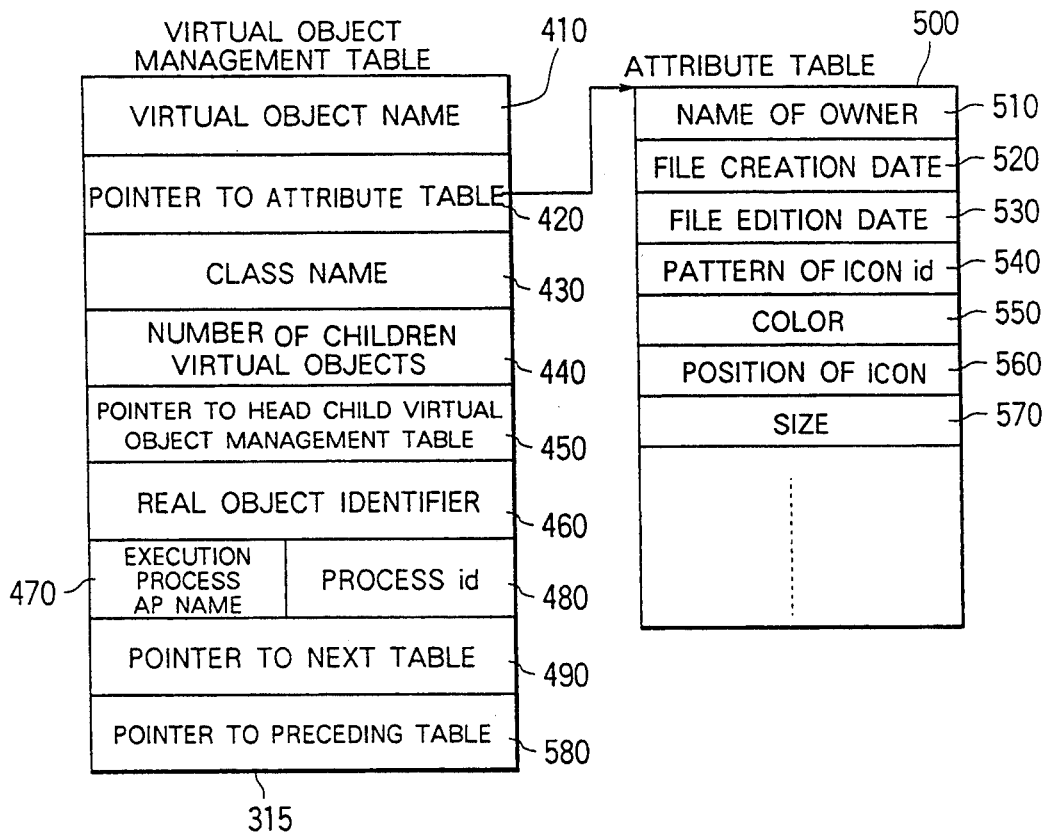
FIG. 5B  ENVIRONMENT MANAGEMENT TABLE FOR EVERY USER
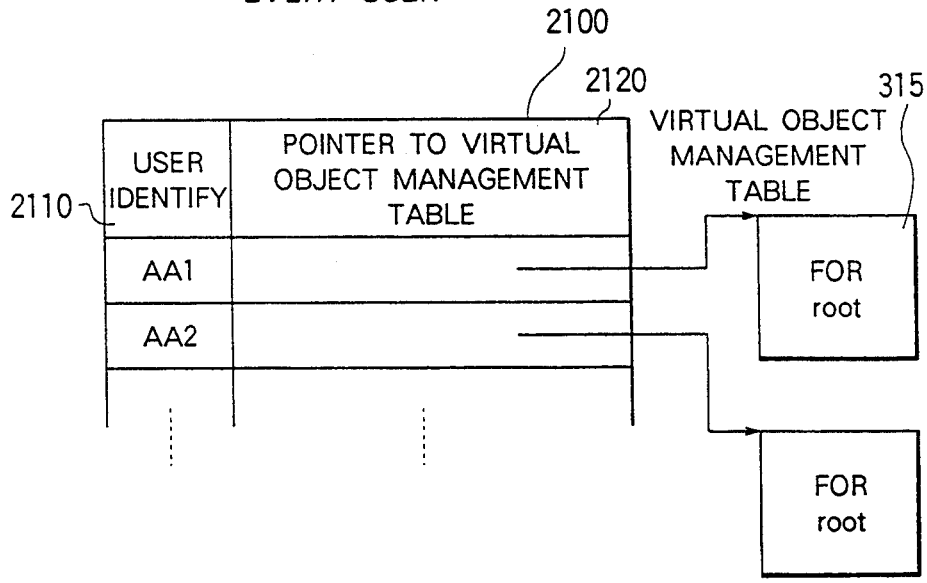

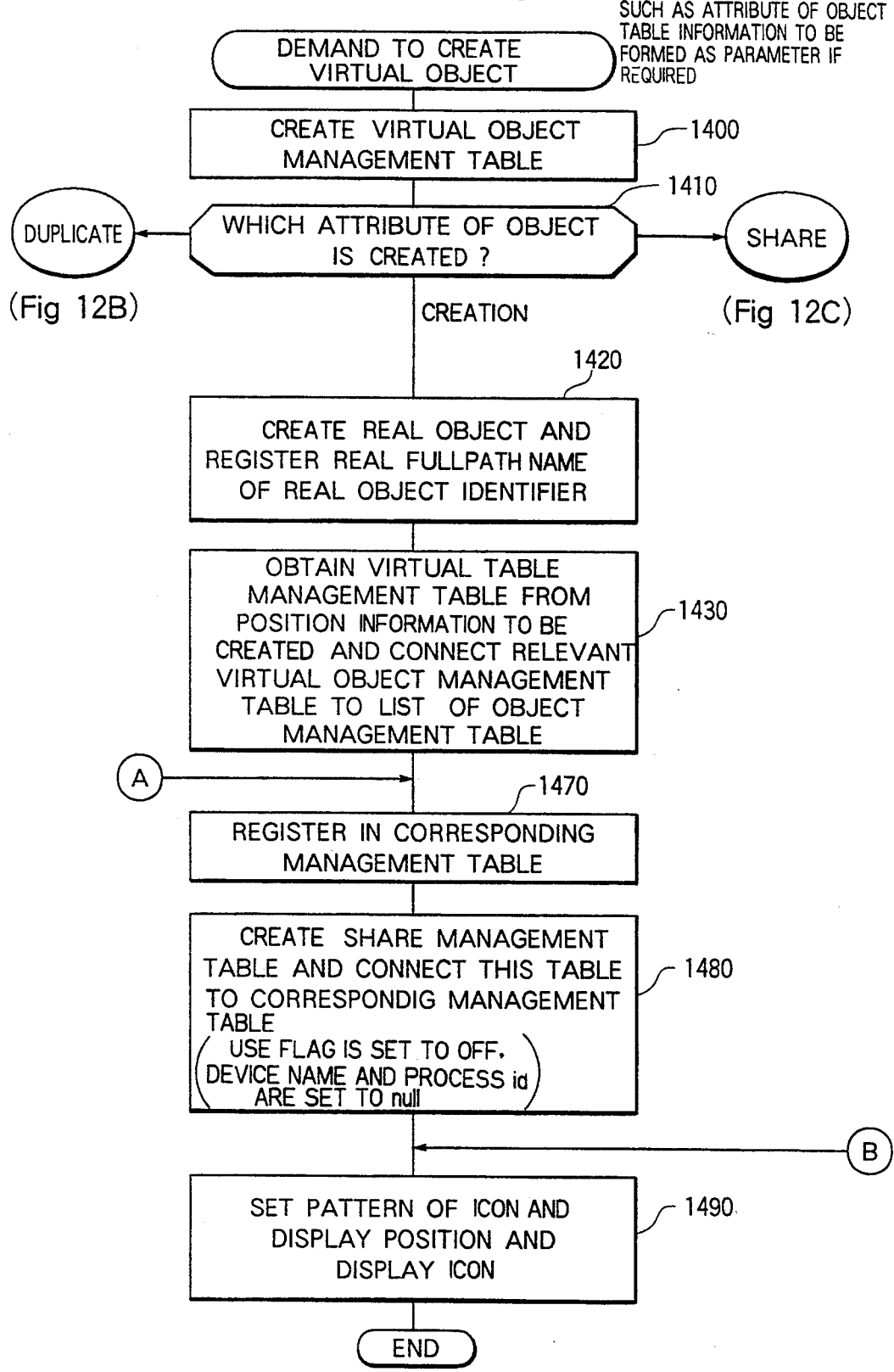

VIRTUAL OBJECT MANAGEMENT SYSTEM FOR MANAGING VIRTUAL OBJECTS WHICH CORRESPOND TO REAL OBJECTS UNDER A USER DEFINED HIERARCHY

BACKGROUND OF THE INVENTION

The present invention generally relates to an object management system. More specifically, the present invention is directed to such an object management system that the objects can be freely managed by a plurality of users.

In the conventional object management systems, there have been well known UNIX systems and MS-DOS systems where the file objects such as data and programs are managed based upon the directory objects in the hierarchical (tree) structure. In such conventional object management systems, there is only one management system within the process system. Accordingly, there is only one hierarchical structure of the object. The data and object are provided with the file object in one-to-one relationship.

U.S. Pat. No. 5,012,405 discloses the file management system such that the files are distributed onto a plurality of memories, and are shared by a plurality of users. This file management system may provide such a virtual managing means for making an expansion of a file system effective only to a specific user. In accordance with the expansion of the file system, the partial trees of the file group having the base tree structure on an arbitrary storage device are coupled as one branch of the file group having the base tree structure on another storage device. As a consequence, the expansion by a specific user does not give adverse influences to other users.

However, the virtual mangements only for the parts to be expanded have been performed in the conventional management systems such as the UNIX system and also in the management system as described in U.S. Pat. No. 5,012,405.

SUMMARY OF THE INVENTION

In a conventional object management system, there is a problem that the same object cannot be managed under the different hierarchical structures of every user, since only a single hierarchical structure of the objects is present in the process system of the object management system.

Also, there is another problem that since, for instance, one data corresponds to only one file object, this data cannot be simultaneously opened by a plurality of windows.

Accordingly, an object of the present invention is to provide an object management system capable of managing the same object under separate hierarchical structures of every user.

Another object of the present invention is to provide an object management system capable of opening, for instance, a single piece of data by a plurality of windows at the same time.

A further object of the present invention is to provide an object management system capable of virtual-managing all of file groups (objects) in a storage device.

In accordance with one aspect of the present invention, an object management system of the present invention, comprises: a single real object management system for managing at least one real file object containing data or a program based upon at least one real directory object in a hierarchical structure; and, at least a single virtual object management system for managing at least one virtual file object corresponding to the real file object on the basis of at least one virtual directory object, which is independent of the real directory object, in a hierarchical structure.

The virtual object management system, with the above-described arrangement, preferably, (a) produces a real object by utilizing the real object management system in response to a demand to newly produce a virtual object, and produces a virtual object corresponding to the real object; (b) duplicates a real object corresponding to a previously provided virtual object by utilizing the real object management system in response to a demand to duplicate the previously provided virtual object, and produces a virtual object corresponding to the real object; and (c) in response to a demand for sharing a real object corresponding to a previously provided virtual object with a plurality of virtual objects, produces a virtual object corresponding to a real object corresponding to the previously provided virtual object.

It should be noted that "a real object" refers collectively to both a real file object and also a real directory object. Similarly, "a virtual object" refers collectively to both a virtual file object and a virtual directory object.

In accordance with the object management system of the present invention, the real objects are managed with only a single hierarchical structure by a similar function to that of the conventional object management system in the real object management system.

On the other hand, the virtual object management system manages the virtual objects with another hierarchical structure independent of the above-described single hierarchical structure, and also manages via this virtual object the corresponding real object.

As previously explained, since it is possible to manage the real object with the virtual hierarchical structure, a single user may set the different hierarchical structures with each other, and also each of the users may set the different hierarchical structures with respect to the individual users.

In accordance with the object management system of a preferred embodiment of the present invention, the virtual object management system may produce another virtual object corresponding to the same real object in response to the demand for sharing the previously provided virtual object in the virtual object management system.

As a result, a plurality of virtual objects corresponding to the same data are simultaneously opened, so that a single piece of data can be opened at the same time by a plurality of windows.

BRIEF DESCRIPTION OF THE DRAWINGS

FIGS. 4A, 4B and 4C are conceptual diagrams for explaining relationships between share states and colors of windows;

FIG. 5A illustrates one example of a construction of a virtual object management table;

FIG. 5B illustrates one example of a construction of an environment management table for each use;

DESCRIPTION OF THE PREFERRED EMBODIMENTS

Referring now to drawings, a description will be made of various preferred embodiments according to the present invention.

Figure 1:
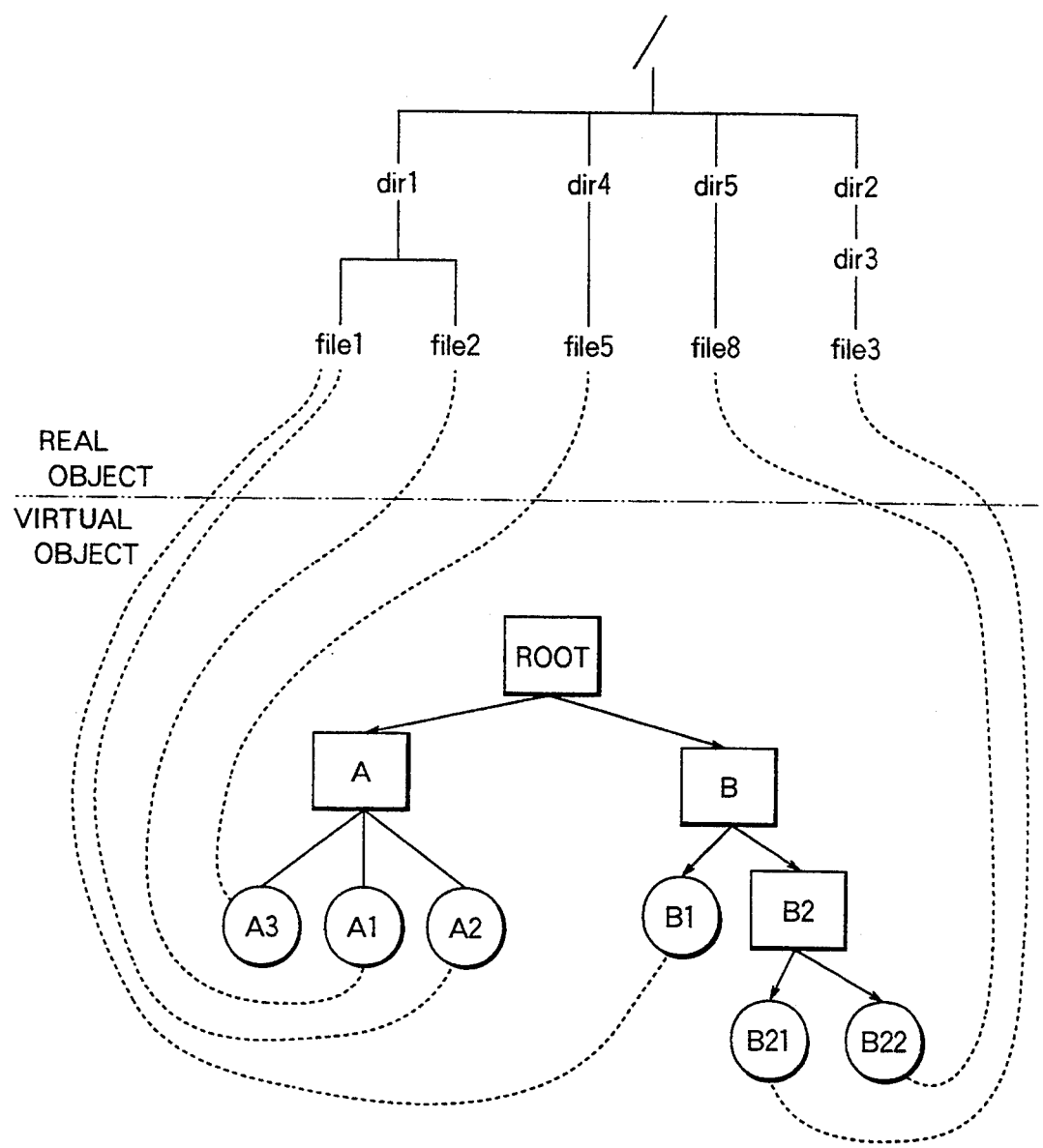
FIG. 1 is a tree structure representing a concept of an object management system according to the present invention.

In FIG. 1, there are shown, at an upper half portion thereof, a tree structure of a real object which has been constructed/managed by a real object management system, and at a lower half portion thereof, a tree structure of a virtual object which has been constructed/managed by a virtual object management system.

The tree structure of the real object corresponds to a real object environment owned by a process system, and a single process system employs a single tree structure. Symbol "/" denotes a real root directory, symbol "dir" represents a real sub-directory, and symbol "file" indicates a real file. It should be noted that in the example of FIG. 1, "file1" and "file2" belong to "dir1"; "file5" and "file8" belong to "dir4" and "dir5", respectively; "dir3" belongs to "dir2" and "file3" belongs to "dir3".

On the other hand, the tree structure of the virtual object corresponds to a virtual object environment owned by a user of the process system, and may be independently constructed/managed for every user. Symbol "root" indicates a virtual root directory; symbols "A", "B" and "B2" represent virtual subdirectories, and symbols "A1" to "A3", "B1", "B2" and "B22" show virtual files.

A broken line represents corresponding relationships among the real files and virtual files.

It should be noted that both the virtual file A2 and the virtual file B1 correspond to the same real file file1.

As described above, in the virtual object management system, at least two virtual files can share a single real file. This condition will be expressed as such a condition where the real file has been share-declared.

Figure 2:
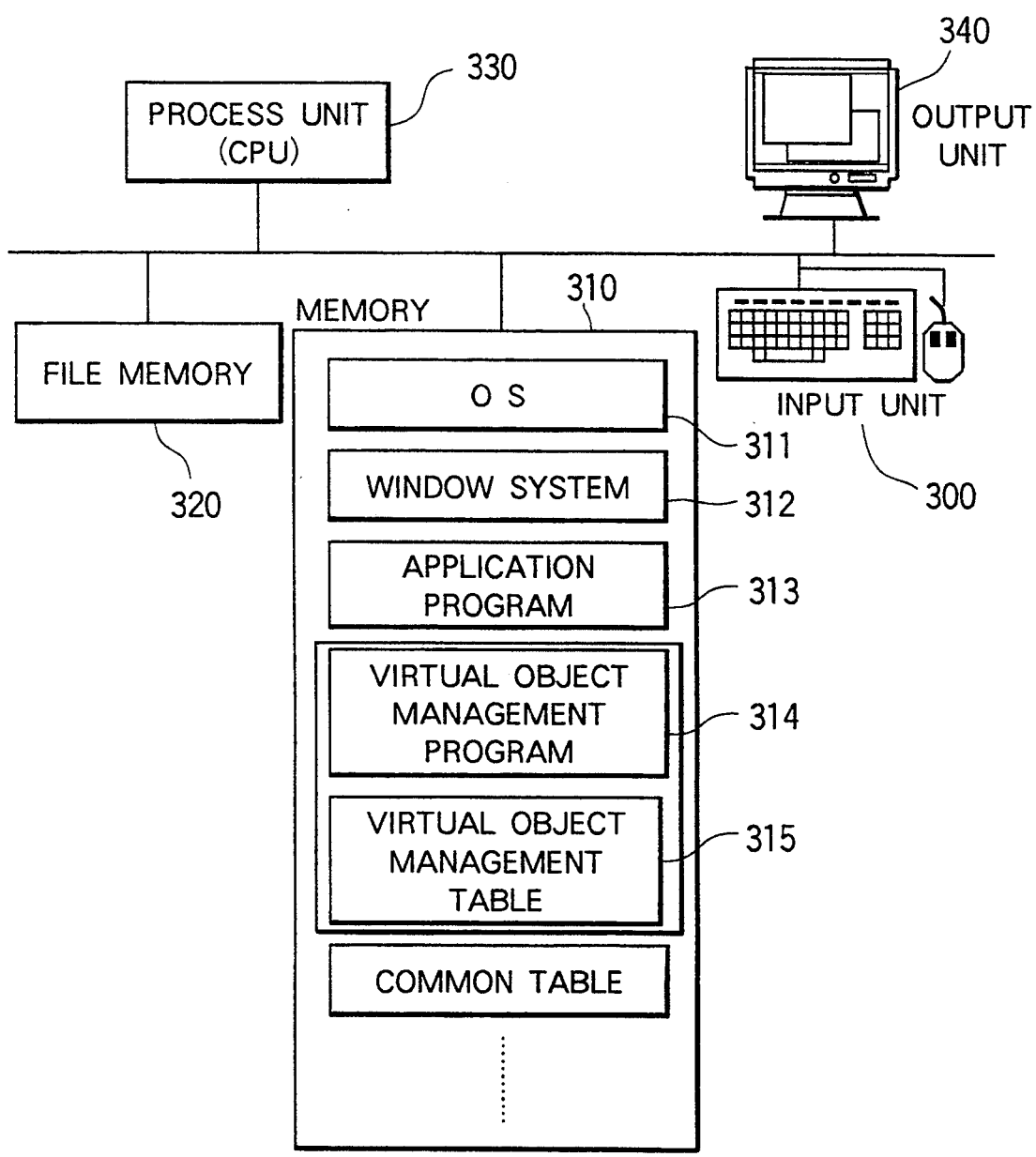
FIG. 2 is a schematic diagram for showing an arrangement of a process system including the object management system according to the present invention.

FIG. 2 is a constructive diagram of a process system including the real object management system and the virtual object management system.

Icons of the virtual objects are represented on an output apparatus by means of OS 311 on a memory 310, a window system 312 and a virtual object management program 314.

When a user selects, for example, an icon corresponding to the virtual file by way of an input unit 300, the virtual object management program 314 reads out the real file corresponding to the selected virtual file from a file memory 320 by utilizing information stored in the virtual object management table 315. Then, a process for setting environment information is executed in conformity with the share states thereof, and subsequently, an execution facility aiming to this real file is performed by employing the process unit 330. The results of the above-described process operation are outputted to the output unit 340.

Figure 3:
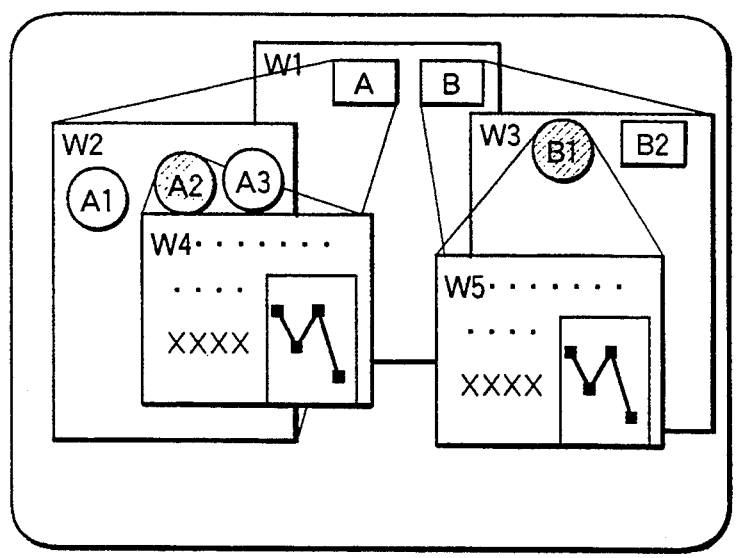
FIG. 3 illustrates an example of a CRT display screen related to the object management system according to the present invention.

In FIG. 3, there is shown an example of a CRT display screen of the output unit 340 in the process system shown in FIG. 2, which corresponds to the tree structure of the virtual object shown in the lower half portion of FIG. 1.

A window W4 discloses or opens the virtual file A2, whereas a window W5 discloses or opens the virtual file B1. As previously explained in FIG. 1, since both the virtual file A2 and virtual file B1 correspond to the same real file file1, the content opened in the window W4 is completely identical to that opened in the window W5. Thus, such a condition that the same real file is simultaneously opened at plural places as separate virtual files will be expressed as a condition under shared use.

FIGS. 4A, 4B and 4C represent that colors of the windows for disclosing the virtual files are changed in response to the share conditions of the real file in the display screen as explained in FIG. 2.

FIG. 4A is such a case that the real file corresponding to an icon A2 1300 being the virtual file, is not a share-declared file. When the icon A2 1300 is disclosed, a color of a window indicative of a single use with no virtual file present which share-declares other real files, is used (1310).

FIG. 4B is such a case that the real file corresponding to an icon A2 1320 being the virtual file is a share-declared file, but is not opened by other icon B1 1330. When the icon A2 1320 is opened, a color of a window is used, which indicates that there is the icon B1 1330 which share-declares the other same real file, but does not open the virtual file (1340). At this time, this color will be referred to as a "share-declaration color". For instance, the share-declaration color is transparent yellow.

FIG. 4C is such a case that the real file corresponding to an icon b 1330 being the virtual file is share-declared file, and also another icon A2 1320 has been already opened. When the icon B1 1330 is opened, the same real file is share-declared, and then a color of a window indicating that there is the icon A2 1320 which has share-declared the same real object and is a virtual file opened is used (1350). This color will be referred to as a "share-declaration color". For instance, this share-declaration color is red. If the previously opened window 1340 is the "share-declaration color", this color is changed into a "share-use color". It should be noted that the information related to the real file is managed by the file memory 320 shown in FIG. 2.

FIG. 5A shows a constructive diagram of the virtual object management table.

The function of this virtual object management table 315 is to connect an icon with a real directory or a real file. The virtual object management table is provided for each virtual object, and owns the following items.

① A title 410 of the virtual object.
② A pointer 420 to an attribute table (attribute table 500 will be described later).
③ A name of class 430 indicative of a sort of virtual objects such as a directory and a file.
④ The number 440 of virtual object for children; when a class is a file, this number always becomes "zero".
⑤ A pointer 450 to a virtual object management table for a head child; when a class is a file, this pointer always becomes "null".
⑥ A read object identifier 460; a real full-path name under the real object environment of the corresponding real object is stored.
⑦ A title 470 of execution process AP; i.e., a script title for describing a command series of an application program 313 to open or execute this virtual object.
⑧ A process id 480; a process id allocated during execution.
⑨ A pointer 490 to a succeeding table, a pointer 580 to a preceding table:

A pointer to the virtual object management tables connected before and after this virtual object management table, when the virtual object management tables belonging to the same directories are coupled in a list form. When there is no connected virtual object management table, it becomes "null".

The attribute table 500 is present for each of the virtual object management tables, and has a function to define an owner and an icon and the like of this virtual object management table. This attribute table 500 owns such items as a name of owner 510, a file creation day 520, a file edition day 520, a picture "id" of icon 540, a color 550, a position of icon 560, and a size 570.

FIG. 5B is a conceptual diagram for showing one example of an environment management table 2100 for each user. This table corresponds to one of the virtual object management tables 315 as shown in FIG. 2.

The environment management table 2100 for each user, which is provided where the system management is carried out, for example, in OS 311, corresponds to a table of a pointer 2120 to the user "id" 2110 and the virtual object management table.

The pointer 2120 to the virtual object management table 315 points to the virtual object management table 315 corresponding to the root directory of the virtual object environment owned by each of the users.

Figure 6A:
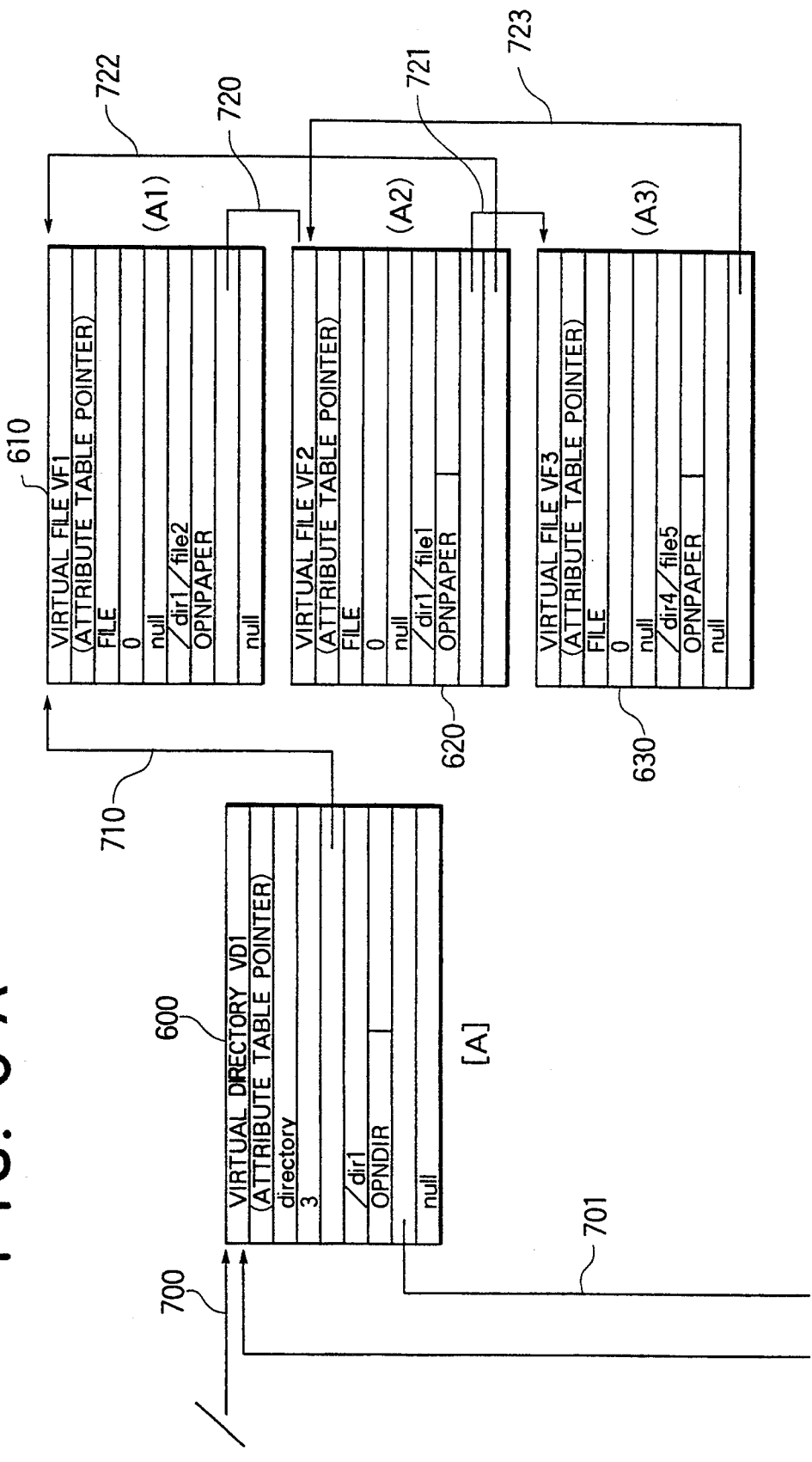
FIGS. 6A and 6B represent one example for showing a use of the virtual object management table.
Figure 6B:
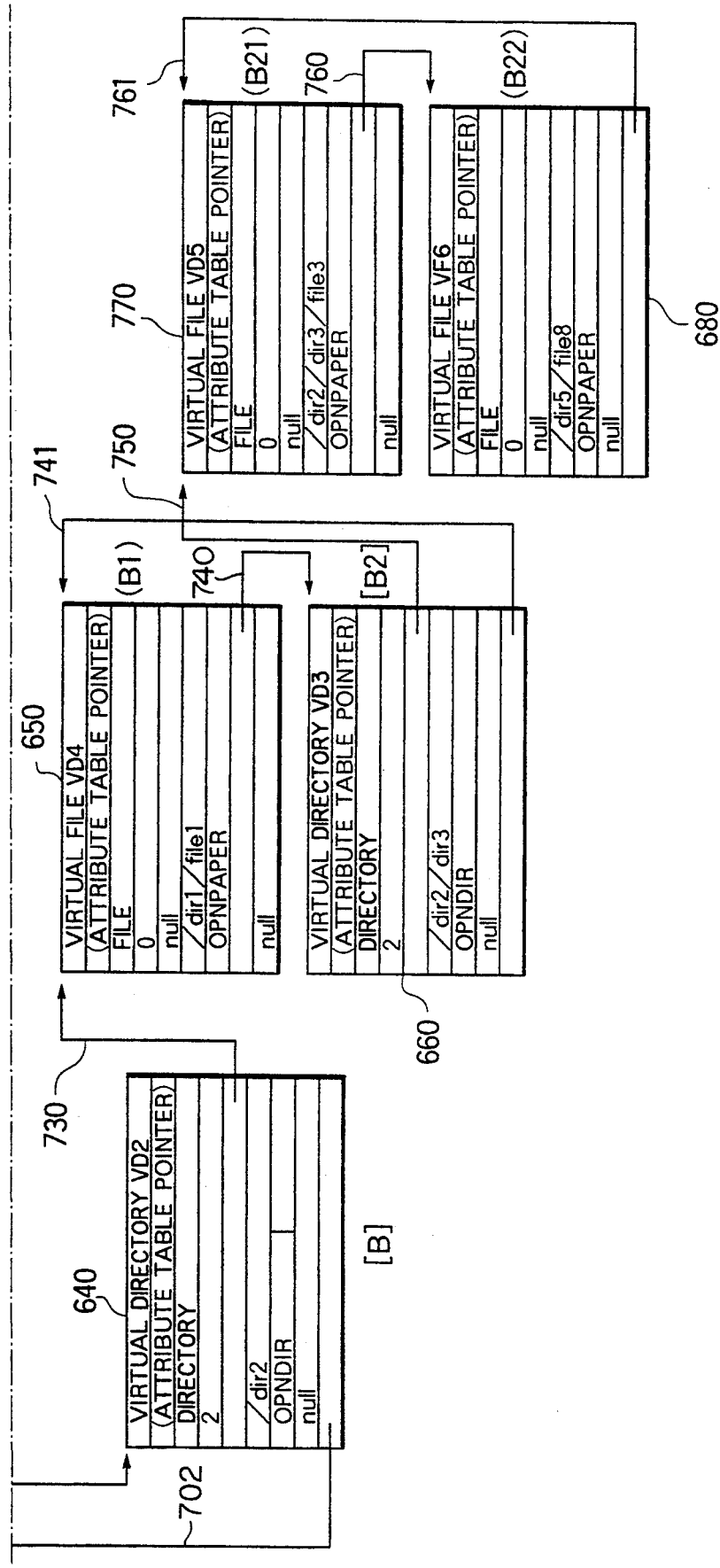

FIGS. 6A and 6B are a conceptual diagram for showing the virtual object environment represented in the lower half portion of FIG. 1 by employing the virtual object management table as explained in FIGS. 5A and 5B.

The virtual object management table 600 is connected to the virtual object management table 640 by the pointer 701, which correspond to the virtual directory present in the same virtual directory (root of FIG. 1). The root of FIG. 1 is connected to the virtual object management table 600 by the pointer 700.

The virtual object management table 600 owns three children virtual object management tables 610, 620 and 630. These three virtual object management tables 610, 620 and 630 are mutually connected to each other by the pointers 720 to 723. The virtual object management tables 600 and 610 are connected with each other by the pointer.

The virtual object management table 640 owns two children virtual object management tables 650 and 660. These two virtual object management tables 650 and 660 are connected with each other by the pointers 740 and 741. The virtual object management tables 640 and 600 are connected with each other by the pointers 701 and 702.

The virtual object management table 660 is a virtual directory, and owns two children virtual object management tables 770 and 680. These virtual object management tables 770 and 680 are mutually connected with each other by the pointers 760 and 761. Both the child virtual object management table 620 belonging to the virtual directory management table 600 and the child virtual object management table 650 belonging to the virtual directory management table 640 define the same fullpath name [/dir1/file1] in the real object identifier.

As previously described, the same fullpath names are defined in the real object identifiers of the plural virtual object management tables, so that the same real file can be shared by the different virtual objects.

Figure 7:
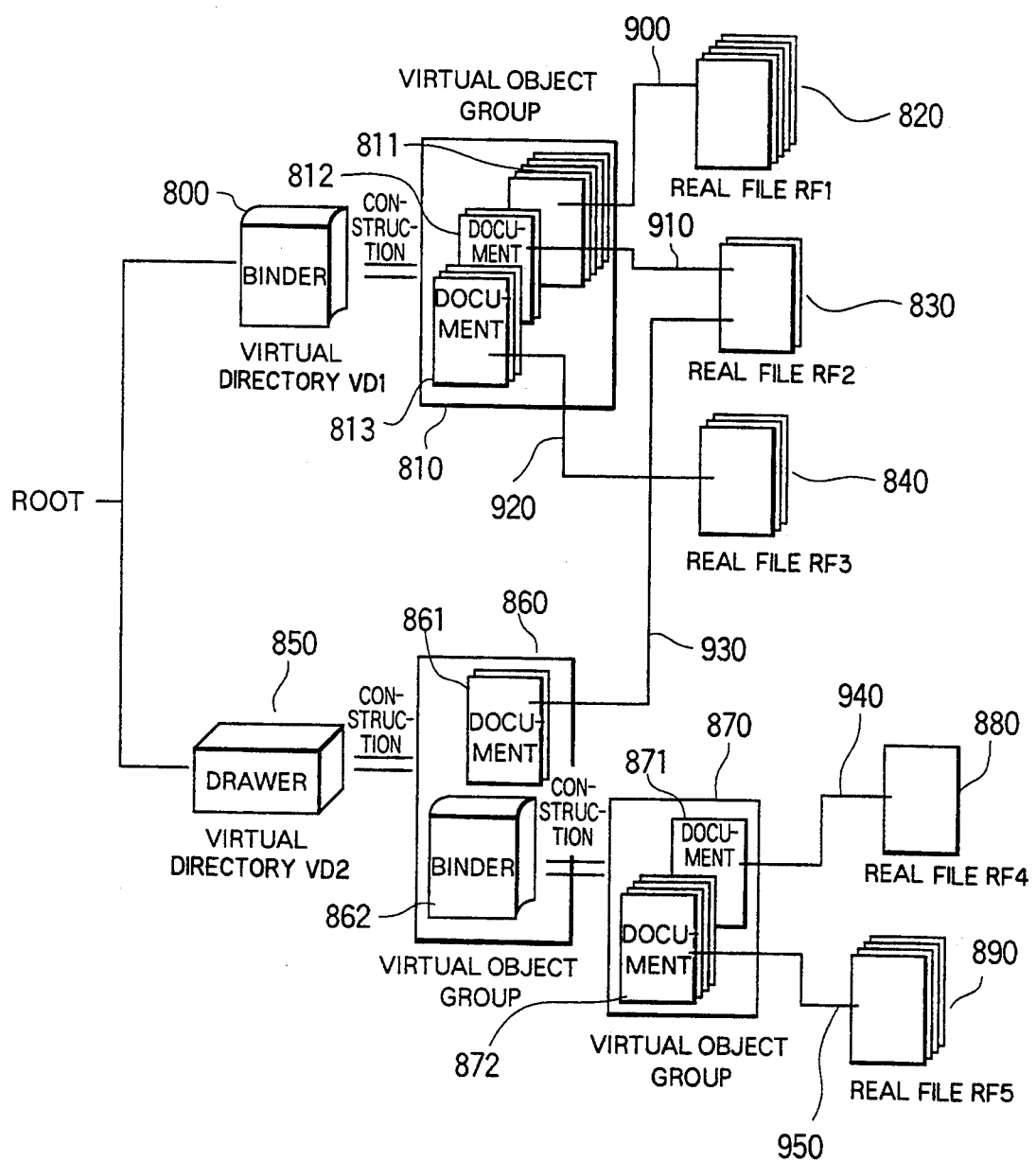
FIG. 7 is an illustration useful for explaining a hierarchical structure (tree structure) of the virtual object.

FIG. 7 is a conceptual diagram for showing the virtual object environment shown in FIG. 6 with employment of a drawer, binders and documents. The drawer indicates a virtual directory lower than the virtual root directory. The binder represents a virtual directory which becomes a child of the drawer. The document shows a virtual file which becomes a child of either the drawer or binder. The document is in reality a real file defined at the real object identifier. Pointers 900, 910, 920, 930, 940 and 950 indicate real files 820, 830, 840, 880 and 890, respectively, defined by the real object identifiers. The substance of the documents 812 and 861 is the same real file 830, as shown by the pointers 910 and 930. In other words, the documents share the real file RF2(830).

The relationship between FIG. 6 and FIG. 7 is as follows: The virtual directory VD2 (640) of FIGS. 6A and 6B correspond to the drawer 850 of FIG. 7, namely the drawer 860. The virtual directory VD1 (600) and the virtual directory VD3 (660) correspond to the binder 800, namely 810, and the binder 862, namely 870 respectively. The virtual files 610, 620, 630, 650, 770 and 680 correspond to the documents 811, 812, 813, 861, 871 and 872, respectively.

Figure 8:
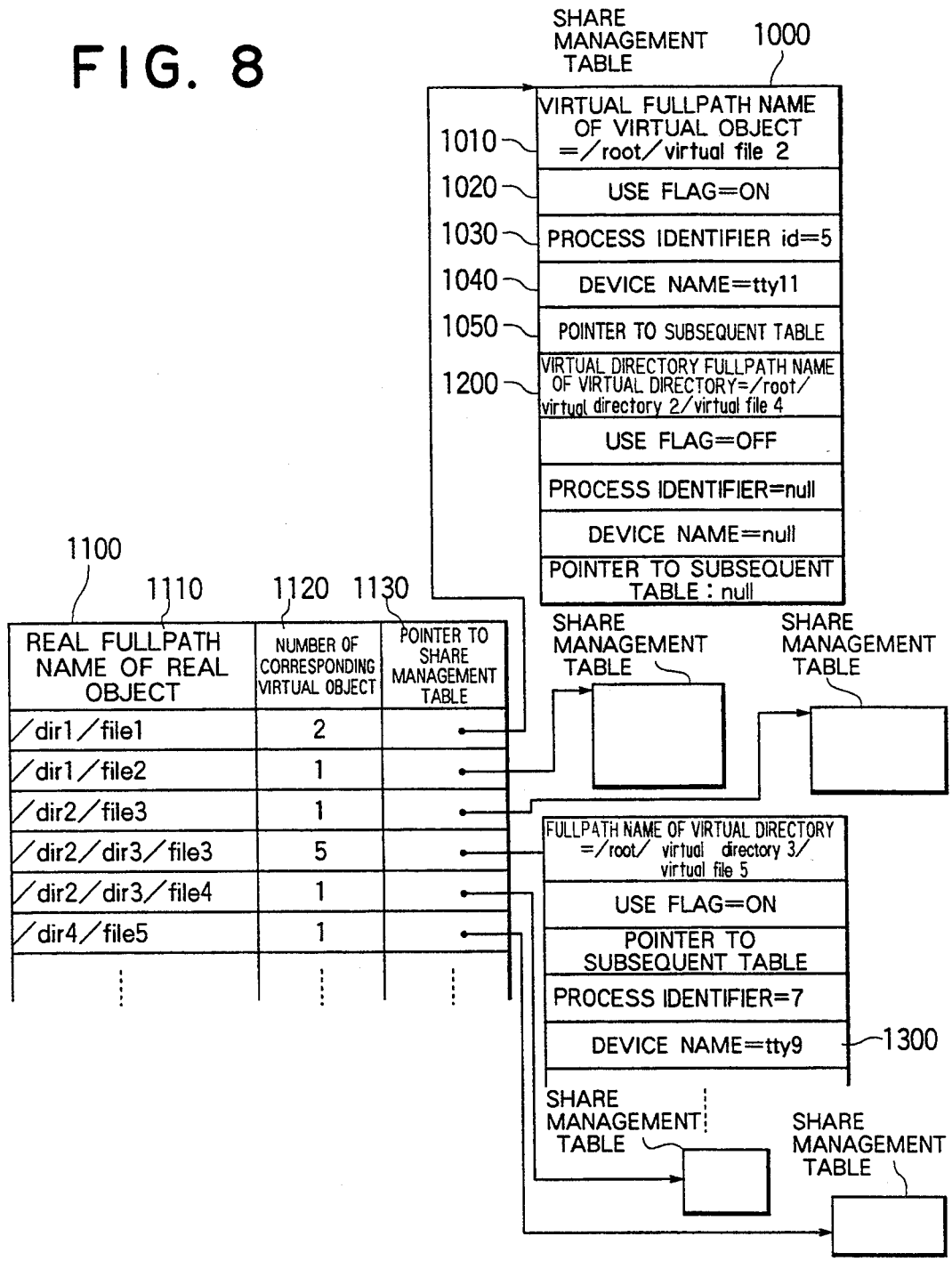
FIG. 8 is an illustration useful for explaining arrangements of a management table and a share management table.

FIG. 8 indicates two tables used for both the relation management and the share management of the real object and the virtual object. These tables are managed in the virtual object management table 315 shown in FIG. 2.

The relation management table 1100 has a function to connect the real object with the share management table 100, and owns the following items.

① A real fullpath name 1110 of the real object.
② The number of virtual object 1120 corresponding to the real object; when there is a share relationship, this number becomes more than one.
③ A pointer 1130 to the share management table.

There are the share management tables 1000 and 1200, the number of which is equal to that of the virtual objects, which own the below-mentioned items:

① A virtual fullpath name 1010 of the virtual object.
② A use flag 1020—a use condition of the relevant virtual object.
③ A process "id" 1030—a process "id" which uses the relevant virtual object.

④ A device name 1040—a name of destination device.

⑤ A pointer 1050 for a next table—indicates a next share management table.

Even when a single real file is shared by a plurality of virtual files, since such a share information management is carried out, the exclusion control to prevent the simultaneous access operations to this single real file can be easily realized and therefore no problem occurs. For instance, since the real fullpath name/dir1/file2 is managed by the share management tables 1000 and 1200 at the first item of the relation management table 1100 shown in FIG. 8, even if the real file /dir1/file1 is shared and simultaneously accessed at two places named as 620 and 650 in FIGS. 6A and 6B, and 812 and 861 in FIG. 7, presence of the virtual files which access to other real files can be recognized by these tables and use flags, so that the exclusive judgement for judging that either access operation should be inhibited can be readily made.

Subsequently, a basic process operation by the virtual object management unit 314 will now be explained.

As the basic process operations of the virtual object, there are a new creation of a virtual object exclusively owning a real file; a new creation of a virtual object sharing other virtual objects and the real file; a duplication of an existing virtual object; a deletion of an existing virtual object; and, an AP execution such as disclosure, which has been registered in the existing virtual object. As a method for providing these process operations to users, the present system employs a method for providing a system menu. Displays of the menu and the execution results of the process operation are outputted from the output unit 340 shown in FIG. 2, and also the selection of the menu as well as the input of parameters required for executing the process operation are carried out by utilizing the input unit 300 similarly shown in FIG. 2. The production of the menu and the execution of the process operation are carried out by the virtual object management program 314.

Figure 9:
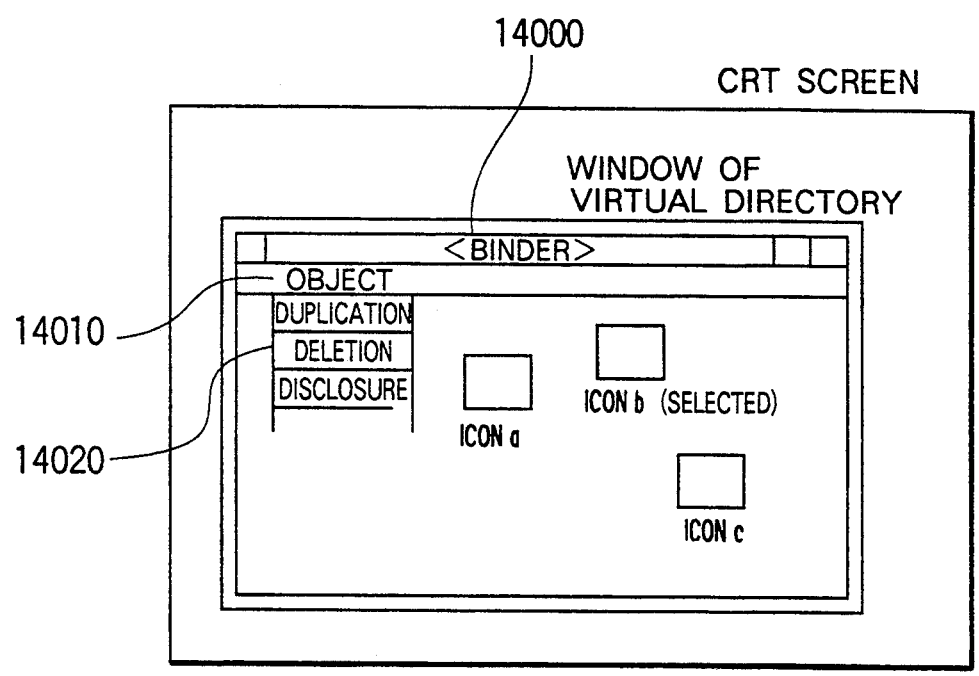
FIG. 9 is a diagram for showing one sample of a process designating figure for the virtual object.

FIG. 9 shows a screen used for designating the basic process by a user, which is executed for the virtual object. When a left button of a mouse is depressed over the virtual objects 14014 to 140212 displayed within a window 14000 shown in the display screen of the output unit, the virtual object management program causes this virtual object to be brought into the selecting state. When the left button of the mouse is depressed over an "object" menu 14020, the available processing items such as the creation/share creation and the duplication/deletion/disclosure (AP execution) are displayed in the form of the pulldown menu (14030). Then, when the left button of the mouse is released over an arbitrary process item within the menu, the corresponding process is initiated.

Figure 10:
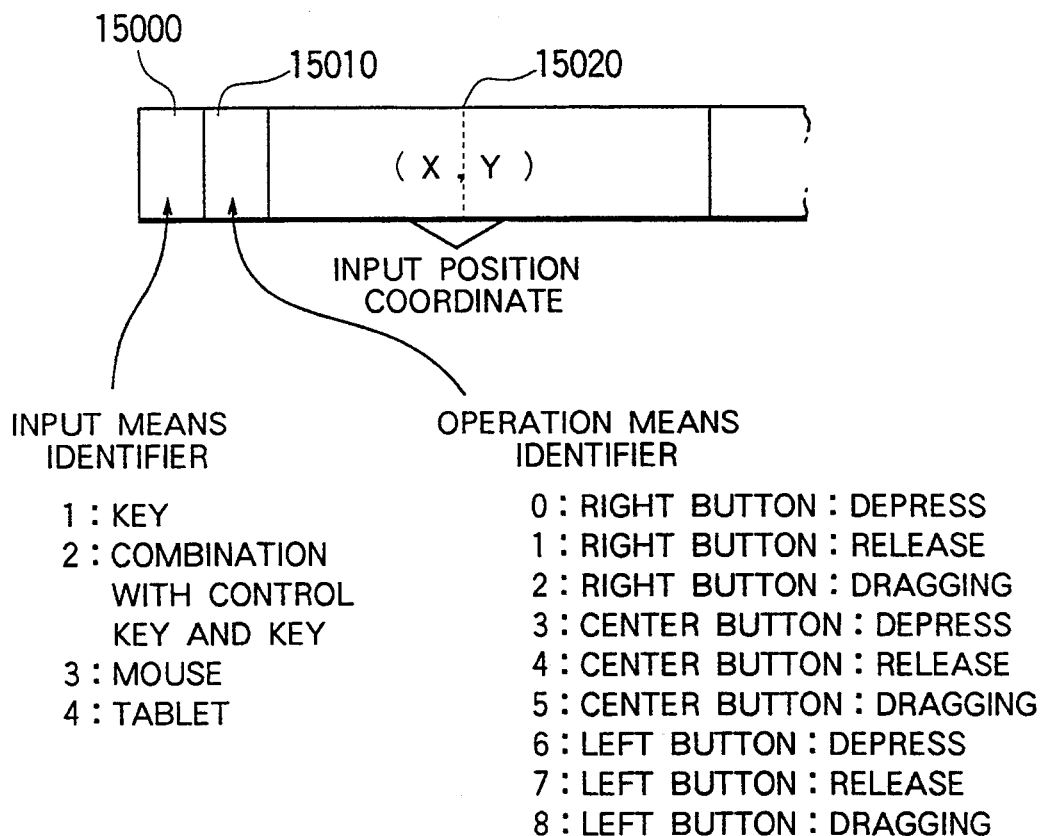
FIG. 10 is a diagram for representing an example of a construction of an input event.

FIG. 10 represents an arrangement of input events which are received from the window system by the virtual object management program. In accordance with this system, the input interface such as the mouse manipulation is realized based on this information. The input events contain at least various information about an input means identifier 15000 for judging whether or not the input is made with the mouse; an operation identifier 15010 for judging how to operate which button, and also input position information over the window. In the present system, 1 byte is prepared for both the input means identifier and the operation identifier within the input event, and the following values are utilized. In the input means identifier 15000, it is assumed that 1 is inputted from the keyboard; 2 is inputted from the keyboard combined with the function key; 3 is inputted from the mouse; and 4 is inputted from the tablet. As the operation identifier 15010 of the mouse, numbers from 0 to 8 are allocated to the respective left/center/right buttons thereof corresponding to the respective events of depress/release/dragging. In the present system, a trigger number having 2 byte-code is used in such a way that the input means identifier is an upper one byte, and the operation identifier is a lower one byte. In other words, the respective operations by the mouse are expressed by $0 \times 31$ to $0 \times 39$ in a hexadecimal notation. The input position information 15020 over the window is expressed as a relative position coordinate under such a case that a lower left position of a subjected window is an origin, and owns coordinate values of X and Y.

Figure 11A:
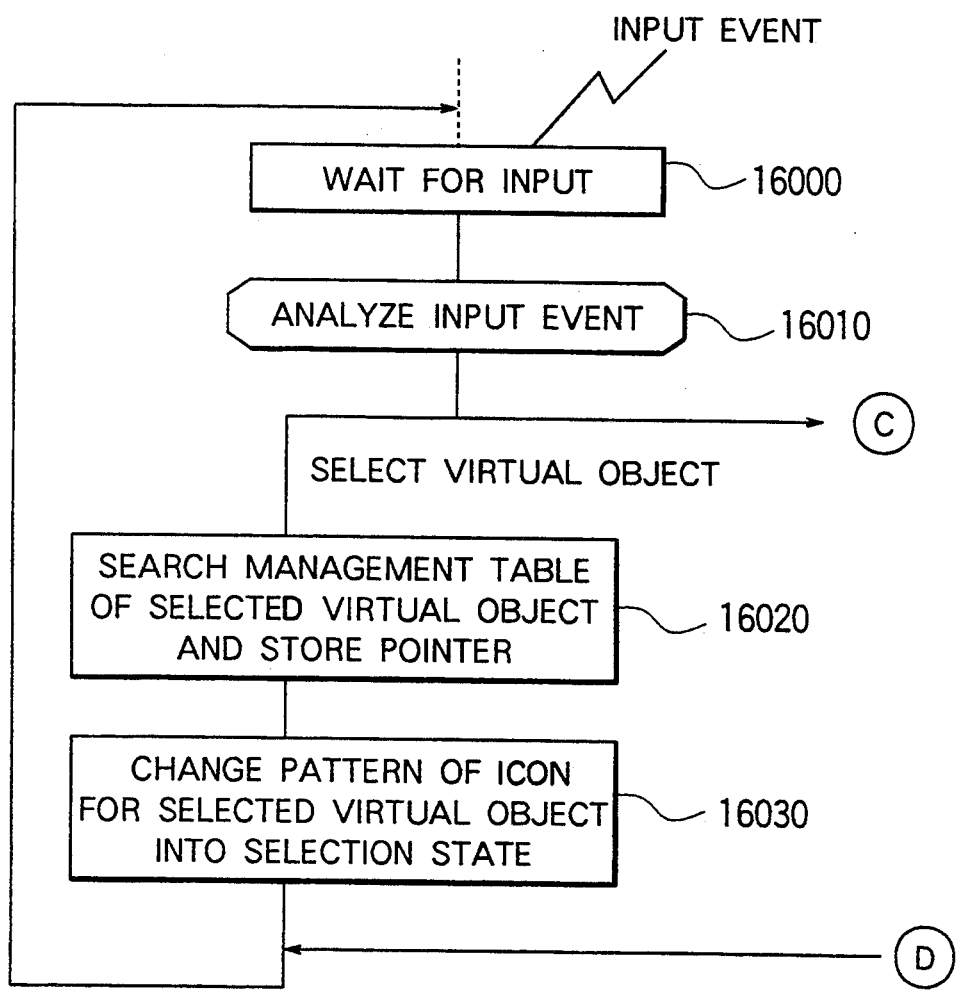
FIGS. 11A and 11B are flowcharts for explaining a process of the input event.
Figure 11B:
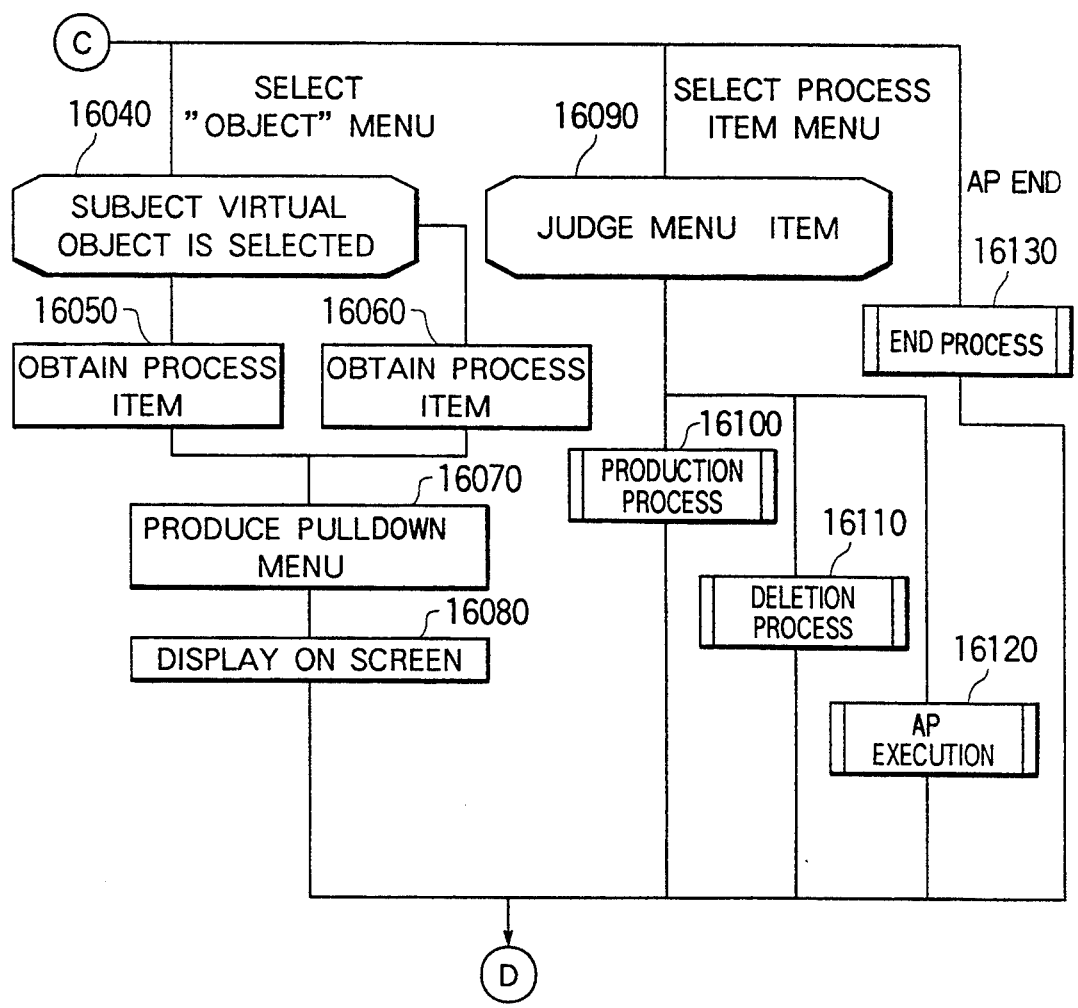

FIGS. 11A and 11B are process flowcharts of the input events. When a user selects an arbitrary object by the mouse, both the trigger number "$0 \times 31$" and the relative coordinate "Xo, Yo" over the window are passed over the process within the virtual object management program in which the relevant window is being used. At a step 16000, the process is brought into the event waiting state. At a step 16010, the contents of the event are analized. If the virtual object is selected, the object management table of the object selected at a step 16020 is searched and then the pointer thereof is temporarily stored. At a step 16030, after the pattern of the subjected icon has been changed into the selection condition, the process is returned to the input waiting state of the step 16000. When a user selects "an object" by the mouse, between the trigger number "$0 \times 31$" and the relative input coordinate ($x_1$, $y_1$) over the window are transferred to the process. At the step 16000, the process is under the event waiting state. At a step 16010, the process analizes the contents of the received event. If the analized content is a selection of the "object" menu, a judgement is made at a step 16040 whether or not the subjected virtual object has been selected. If this virtual object is selected, then the process item executable for the selected virtual object is obtained at a step 16050. Conversely, if this virtual object is not selected, then the process item related to the creation of the virtual object is obtained at a step 16060. Then, a pulldown menu for representing the obtained process item is produced at a step 16070. At a further step 16080, the pulldown menu is displayed by utilizing the process of the window system, and thereafter the process is returned to the input waiting state at the step 16000. When the user selects the desired process to be executed from the displayed pulldown menu, the process receives as the event values, both the trigger member and the relative input coordinate ($x_2$, $y_2$) within the window. At the step 16010, the process analizes the contents of the received event. If the analized content is one of operation menu items, the process obtains which menu has been selected by identifying the construction of the operation menu at the step 16090. If the content of the received event corresponds to the process related to the creation of the virtual object management table such as the creation/duplication of the virtual object, the process is advanced to a step 16100. If the content of the received event corresponds to the deletion of the subjected virtual object, the process is advanced to a step 16110. Also, if the content of the received event corresponds to the AP initiation, such as disclosing, registered in a target virtual object, the process is advanced to a step 16120. Upon completion of the respective processes, the process is again returned to the input waiting condition as defined at the step 16000. Also, the initiated AP is present as a separate process, and an end of the AP is realized by designating a completion by the user. In accordance with the present system, it is so designed that when the AP is ended, either an end signal or an end message is transmitted, which will be received at the step 16000. If the content of the event is analized at the step 16010 and the AP is accomplished, the end process is executed at a step 16130, and thereafter the process is again brought into the input waiting state at the step 16000. The respective process flows as defined at the steps 1610 to 16130 will now be described with reference to FIGS. 12A to 12C and FIGS. 13 to 15.

Figure 12:
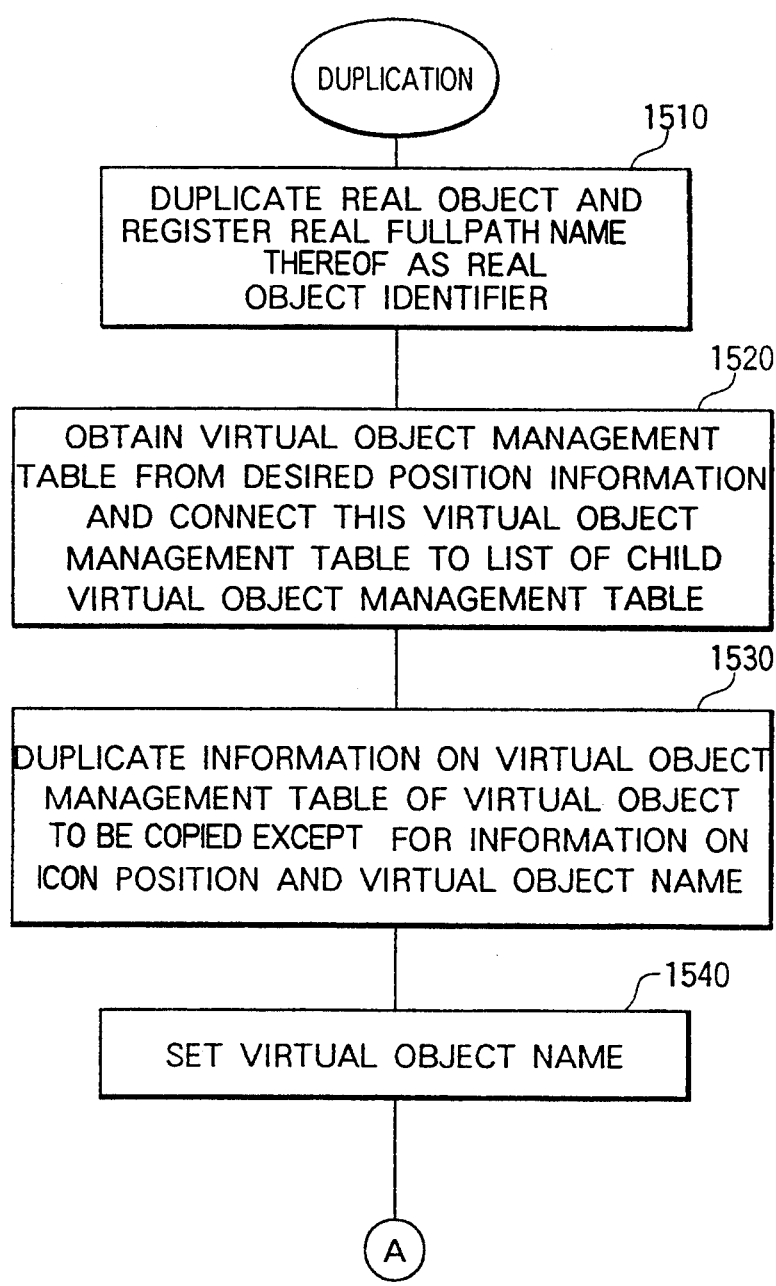
FIGS. 12A, 12B and 12C are flowcharts for explaining a production process of the virtual object.
Figure 12:
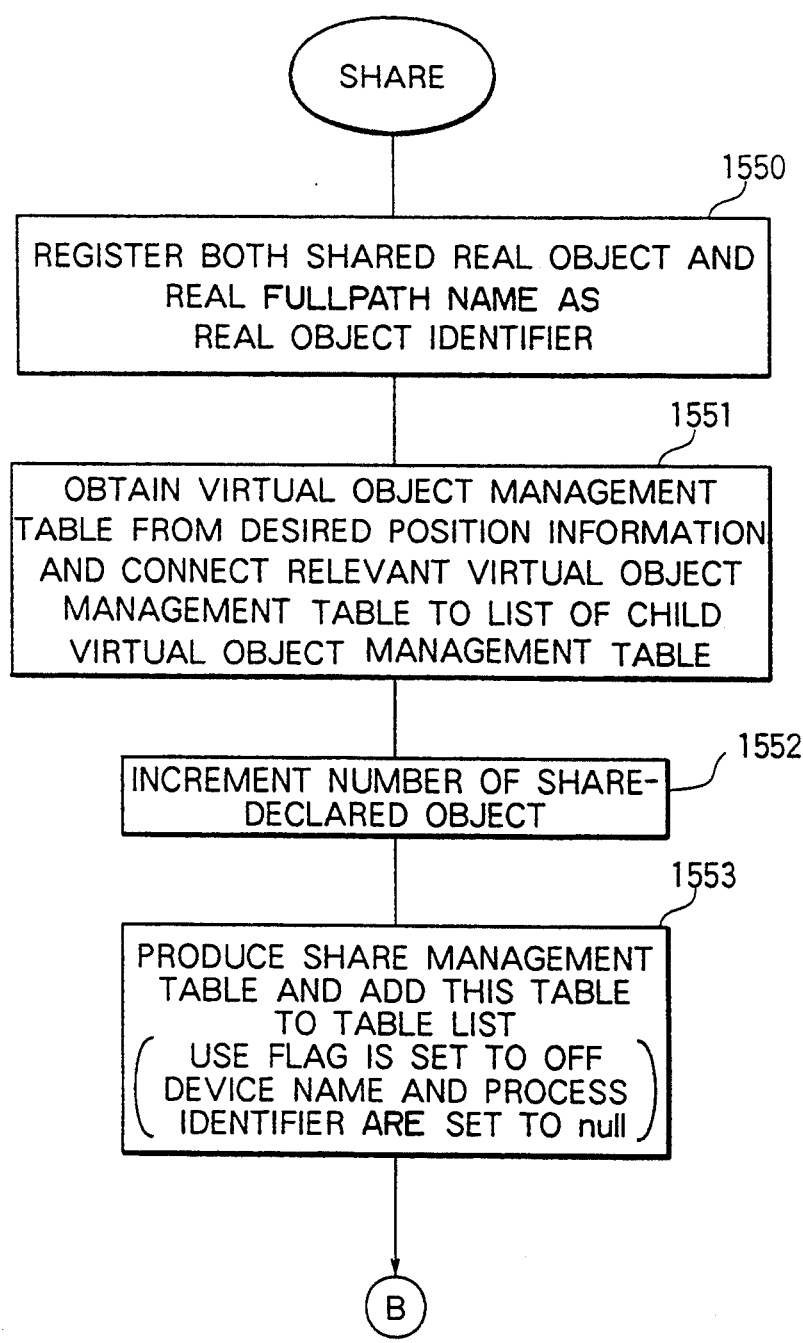
Figure 13:
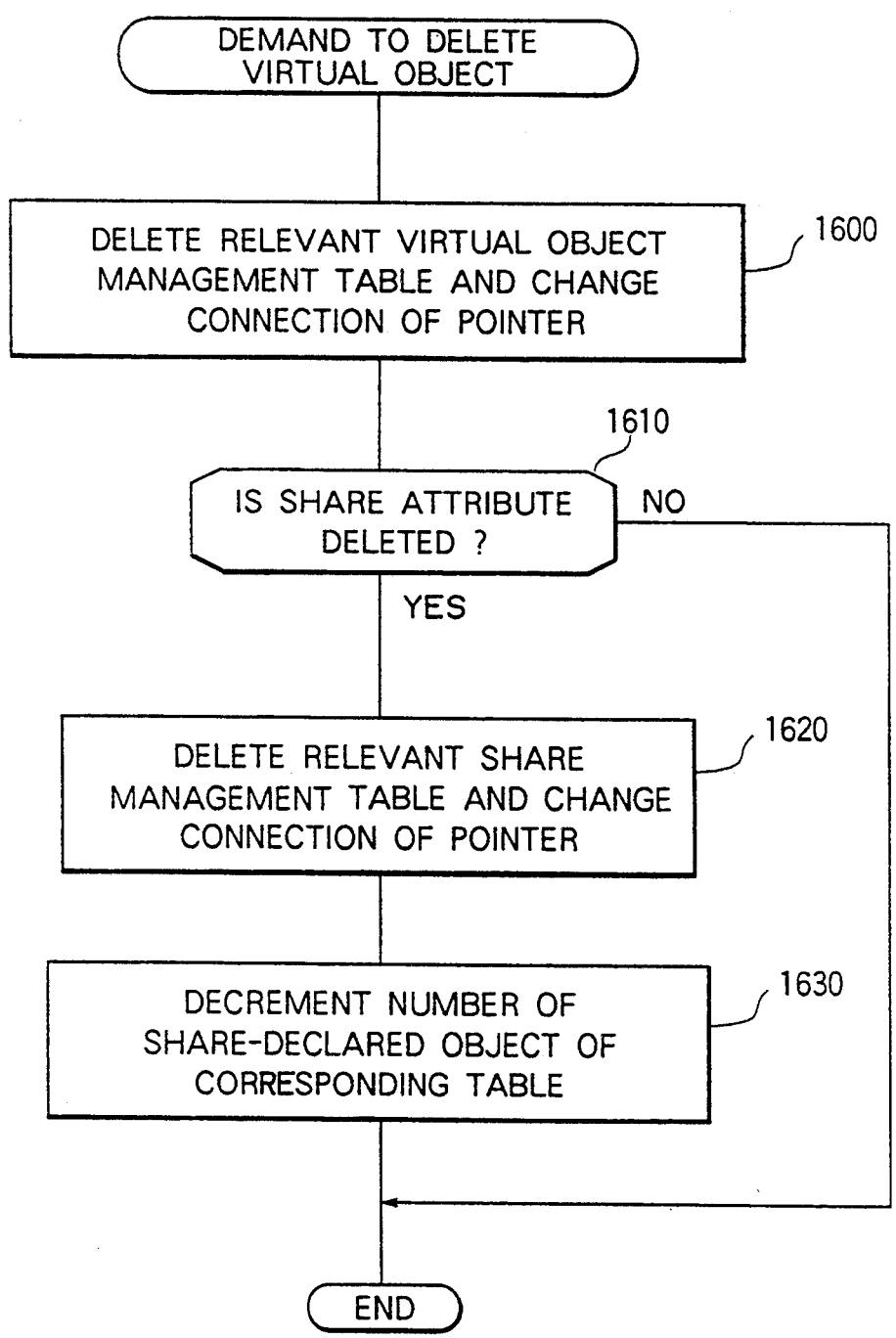
FIG. 13 is a flowchart for explaining a deletion process of the virtual object.

FIGS. 12A to 12C are flowcharts for explaining a process to create a virtual object.

In FIG. 12A, a user inputs an attribute or the like of a desirable virtual object to be formed, and also a desired position to be formed in accordance with a menu command and an operation sequence and so on.

As to the attribute of the virtual object, there are three attributes, namely "creation" (in case when a virtual object is newly created; "duplication (copy)" (in case when a existing virtual object is duplicated to create another virtual object); and "share" (in case when a new virtual object is created so as to share a real file corresponding to an existing virtual object).

Upon receipt of a creation demand, the virtual object management project 314 creates a single virtual object management table at a step 1400.

At a step 1410, a check is made of the attribute of the virtual object. If the attribute corresponds to the "new creation", then this process is advanced to a step 1420. If the attribute corresponds to the "duplication", then the process is advanced to a step 1510. If the attribute is the "share", then the process is branched to a step 1550.

At the step 1420, the actual object is produced by utilizing the actual object management system, and thus, a real fullpath name thereof is registered into a real object identifier 460 of the previously created virtual object management table 315.

At the step 1430, a virtual object management table which becomes a parent virtual directory is obtained from the information about the position of the desired virtual object obtained as the parameter, and then this virtual object management table is connected to the list of the child virtual object thereof.

At a step 1470, the real fullpath name of the previous real object is registered into the real fullpath name 1110 of the corresponding management table 1100, and "1" is registered into the corresponding virtual object number 1120.

At a step 1480, a share management table 1000 corresponding to the virtual object management table created at the previous step 1400 is created. The virtual fullpath name of the previous object is registered into the virtual fullpath name 1010 of the share management table 1000, the use flag 1020 is set to "OFF", and also the process id 1030, device name 1040, and the pointer 1050 for the next table are set to "null". Then, the created share management table is connected to the corresponding management table by a pointer 1130.

At a step 1490, the information related to the icon and the like is set, and the icon is displayed on the screen of the output unit 340.

On the other hand, at a step 1510 of FIG. 12B, the actual object corresponding to virtual object to be copied is duplicated by using the real object management system, and then the real fullpath name of the real object which has been created by way of the duplication, is registered to the real object identifier 460 of the previously created virtual object management table 315.

At a step 1520, a virtual object management table of a parent virtual directory is obtained from the information about the position of the desired virtual object, and then the previous virtual object management table is connected to the list of the child virtual object thereof.

At a step 1530, the information stored in the virtual object management table for the virtual object to be originally copied is duplicated except for the icon position and the virtual object name that are such information specific to the virtual object.

At a next step 1540, a virtual object name of the virtual object management table is set.

Subsequently, this duplication process jumps to a step 1470 defined in FIG. 12C.

On the other hand, the information about the shared real object is obtained from the parameter at a step 1550 shown in FIG. 12C. When the real fullpath name is obtained from the acquired information, this real fullpath name is registered into the real file identifier of the created virtual object management table. If the name of the virtual object is obtained from the acquired information, the name of the actual fullpath name is acquired from the virtual object management table belonging to this virtual object, and then this name of the real fullpath is registered into the real file identifier of the created virtual object management table.

At a step 1551, a virtual object management table of a virtual directory which will become a parent is obtained from the positional information of the desired virtual object, and then the previous virtual object management table is connected to a pointer of a child virtual object thereof.

At a step 1552, the number of the virtual object corresponding to the line of the real fullpath name shared within the relevant management table 1100 is incremented by 1.

At a step 1553, a share management table 1000 is created. A use flag 1020 is set to "OFF" whereas both the process id 1030 and the device name 1040 are set to "null". Then, this share management table is connected to a pointer of the corresponding share management table.

Next, the process operation jumps to a step 1490 shown in FIG. 12A.

Upon issue of a deletion demand for a virtual object, the relevant virtual object management table is searched at a step 1600, and then this management table is deleted and also connection of the pointer of the virtual object management table is changed.

At a step 1610, a check is made whether or not the attribute of the virtual object to be deleted is shared. If the attribute is not shared, the process operation is accomplished without any further process operation. If the attribute is shaped, then the process operation is advanced to a step 1620.

At the step 1620, a retrieving operation is carried out for the list of the share management table which is connected to the line of the real object name corresponding to the virtual object to be deleted within the relevant management table. Furthermore, the share management table corresponding to the virtual object to be deleted is deleted, and connection of the pointer of this share management table is changed.

At a step 1630, the number of the virtual object corresponding to the above described management table 1100 is decremented.

Figure 14:
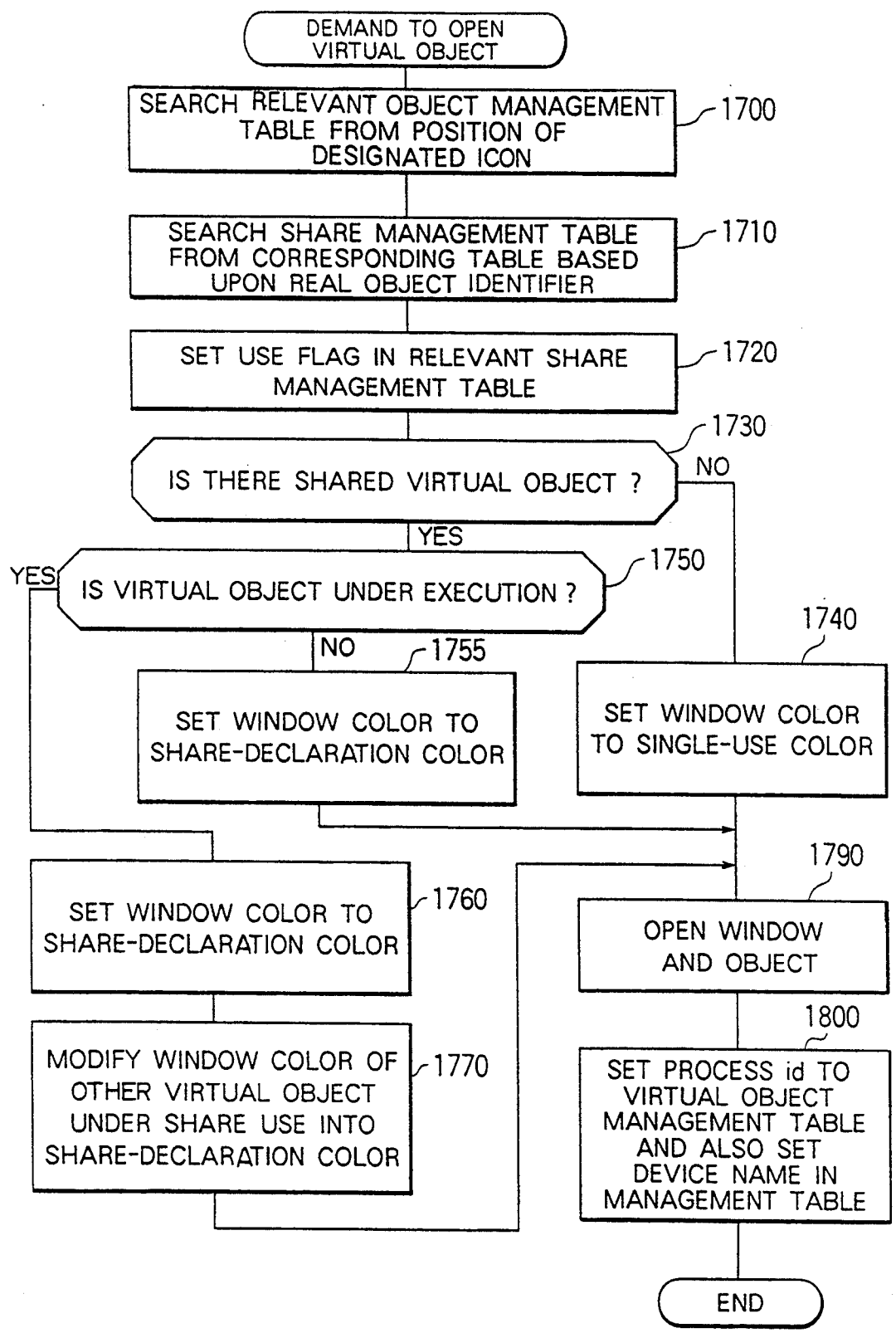
FIG. 14 is a flowchart for explaining a process to open the virtual object; and, FIG. 15 is a flowchart for explaining a process to close the virtual object.

Then, FIG. 14 shows a flowchart for explaining an opening process operation in case that a virtual object is a document. In this process operation, the exclusive control is not carried out, but such a method is employed that the share condition is indicated by a window color.

When an icon is designated and an open demand is issued, the virtual object management table of the virtual object corresponding to this icon is retrieved at a step 1700.

At a step 1710, based upon the real object identifier contained in the virtual object management table, the corresponding share management table is searched from the corresponding management table.

At a step 1720, a use flag contained in the share management table is set to ON.

At a step 1730, a check is done whether or not there are shared virtual objects, taking account of the quantity the virtual objects 1120 corresponding to the relevant management table 1100. If there is no shared virtual object, then the process operation is advanced to a step 1740. Conversely, if there are the shared virtual objects, then the process operation is advanced to a step 1750.

At a step 1740, colors of windows allocated to the relevant objects are set to a single-use color.

At a step 1790, the open process for both the windows and objects is performed.

At a step 1800, the process id which has been allocated at this time is set to the virtual object management table. Also, a name of a used device is set to the share management table.

On the other hand, at a step 1750, a check is made whether or not other shared virtual objects are under execution. If the virtual objects are not executed, then the process is advanced to a step 1755. Conversely, if the virtual objects are under execution, the process operation is advanced to a step 1760.

At a step 1755, a color of a window which will be allocated to the relevant object is set to a share-declaration color.

On the other hand, at a step 1760, a color of a window which will be allocated to the relevant object is set to a share-use color.

At a step 1770, colors of windows of the other virtual objects under execution are also changed into share-declaration colors.

It should be noted that although the share conditions are expressed by way of the displayed colors of the windows in the above-described preferred embodiments, the share conditions may be alternatively represented by colors, widths and shapes of the window frames, or designs of the icons.

Figure 15:
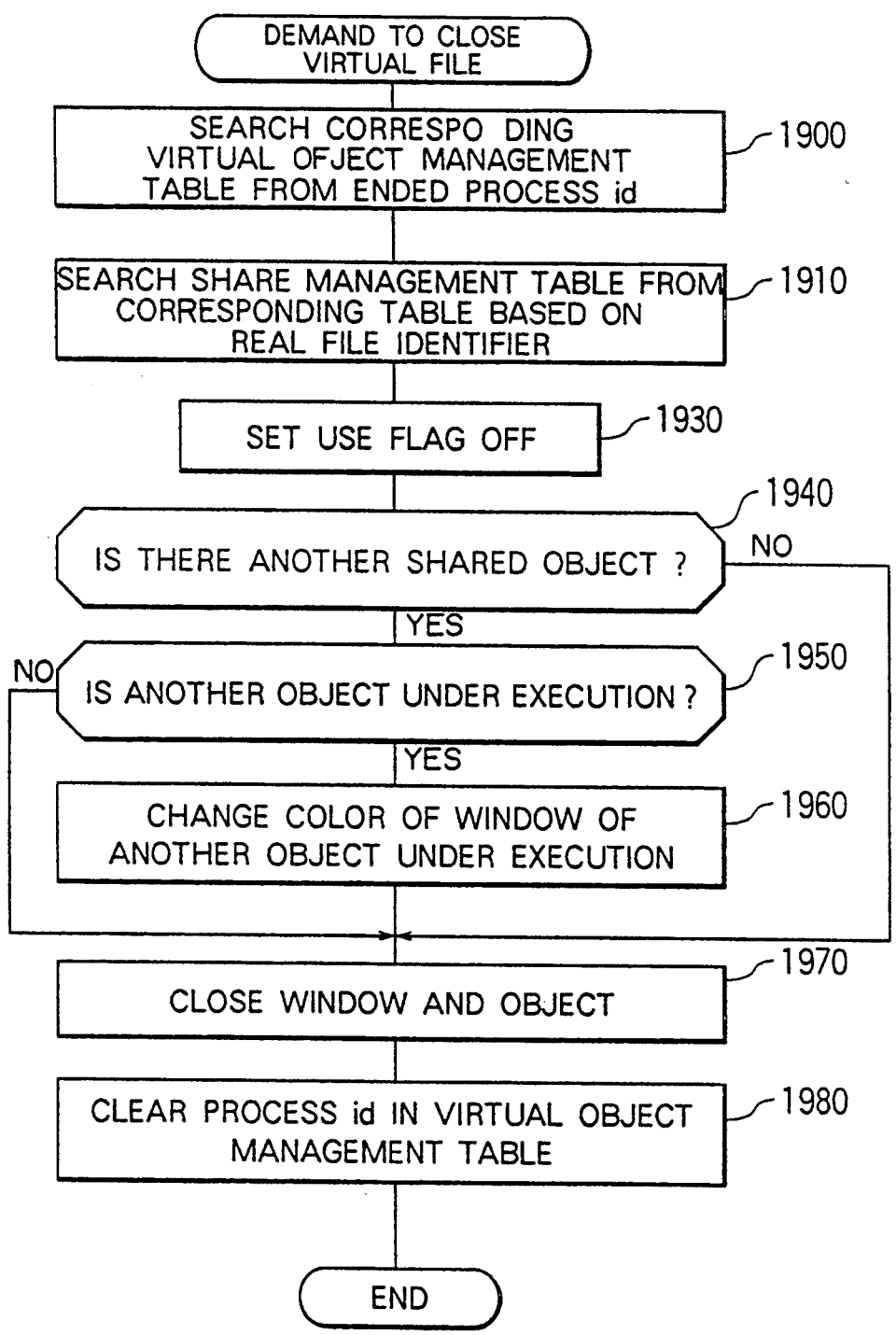

FIG. 15 is a flowchart for explaining a process to close a virtual object.

At a step 1900, upon receipt of a demand to close an object, a relevant virtual object management table is retrieved from this process id.

At a step 1910, based upon a real object identifier within this virtual object management table, the corresponding share management table is searched from the corresponding management table.

At a step 1930, a use flag in a share management table is set to OFF.

At a step 1940, a check is made whether or not there is another shared virtual object. If no shared virtual object is present, then the process operation jumps to a step 1970. Conversely, if the shared virtual object is present, then the process operation is advanced to a step 1950.

At a step 1950, a check is performed whether or not another shared virtual object is under execution. If this virtual object is not under execution, then the process operation jumps to a step 1970. If this virtual object is under execution, then the process operation is advanced to a further step 1960.

At the step 1960, the color of the window which has been allocated to this virtual object under execution is changed from the share-use color into the share-declaration color.

At a step 1970, a process to close both the window and the virtual object is executed.

At a step 1980, a process id contained in the virtual object management table is cleared.

It should also be noted that although the pointers are realized in a linear form in the above-described preferred embodiment, another form may be alternatively employed such that the last table indicates the first head table.

Also, the attribute may be judged in such a manner that a flag for judging whether a file is shared or not, which indicates whether or not a subjected virtual object has a "share" attribute, is employed within a virtual object management table, and if this flag is ON, then the file is shared, whereas if this flag is OFF, then the file is not shared.

In accordance with the object management system of the present invention, since the actual objects can be managed by way of the virtual hierarchical structure, a single user may set the different hierarchical (tree) structures and also it is possible to set the hierarchical structures different for each user.

Moreover, since a plurality of virtual objects can be prepared in association with the same real object, for instance, while opening the same document by a plurality of windows, different pages may be edited at the same time. It is also possible to visually confirm that the same document is shared with other documents. Furthermore, such a hierarchical structure may be defined that a document relating to plural fields is separately managed by each of the plural fields. In this case, since any data in any one of the plural fields can be updated, the data managing operability can be improved.

While the invention has been particularly described and shown with reference to the preferred embodiments thereof, it will be understood by those skilled in the art that various changes in form and detail and omissions may be made therein without departing from the spirit and scope of the invention.

What is claimed is:

1. An object management system comprising:
    a single real object management system wherein at least one real life object containing data or a program is managed by at least one real directory object in a hierarchical structure; and
    at least a single virtual object management system wherein at least one virtual file object corresponding to said real file object is managed by at least one virtual directory object in a hierarchical structure, said one virtual directory object being independent of said real directory object, wherein said virtual object management system includes:

(a) means, responsive to a demand for newly creating another virtual object including a virtual file object or a virtual directory object, for newly creating a real object including a real file object or a real directory object by utilizing said real object management system, and for producing a virtual object corresponding to said real object;

(b) means, responsive to a demand for duplicating a previously provided virtual object including a virtual file object or a virtual directory object, for duplicating that real object including a real file object or a real directory object which corresponds to said previously provided virtual object by utilizing said real object management system, and for producing a virtual object corresponding to said duplicated real object; and (c) means, responsive to a demand for sharing with a plurality of virtual objects, that real object including a real file object or a real directory object which corresponds to a previously provided virtual object including a virtual file object or a virtual directory object, for creating at least one virtual object corresponding to said real object.

2. The object management system as claimed in claim 1, wherein said virtual object management system includes:

(a) first display means for defining icons of each of said virtual file objects and of each of said virtual directory objects so as to display said icons on a window of a display screen;

(b) means, responsive to a selection of an icon made by a user for said icons being displayed, for judging whether said selected icon corresponds to said virtual directory object, or said virtual file object;

(c) second display means, responsive to a result of the judging that said selected icon corresponds to a virtual directory object, for displaying an icon corresponding to a virtual file object belonging to said judged virtual directory object on another window;

(d) means, responsive to a result of the judging result that said selected icon corresponds to a virtual file object, for judging whether a real file object corresponding to said judged virtual file object corresponds to data, or a program;

(e) means, responsive to a result of the judging that said real file object corresponds to a data, for opening said corresponding real file object on a window; and, (f) means, responsive to a result of the judging that said real file object corresponds to a program, for executing said corresponding real file object.

3. The object management system as claimed in claim 2, wherein said first display means includes:

means for defining and displaying each of one icon and another icon in visually discriminatable form, said one icon corresponding to such a virtual object that same real object including a real file object or a real directory object is not shared with another virtual object including a virtual file object or a virtual directory object, and said another icon corresponding to such a virtual object that same real object is shared with another virtual object.

4. The object management system as claimed in claim 2, wherein said opening means includes:

means for displaying in visually discriminatable form, such a window that a real file object is not shared with a plurality of virtual file objects, and such a window that a real file object is shared with a plurality of virtual file objects.

5. The object management system as claimed in claim 2, wherein said opening means includes:

means for displaying in visually discriminatable form, such a window that only one of virtual file objects which share same real file object is opened, and also such windows that at least two virtual file objects are simultaneously opened.

6. An object management system comprising:

a single real object management system wherein at least one real file object containing data or a program is managed by at least one real directory object in a hierarchical structure; and, at least a single virtual object management system wherein at least one virtual file object corresponding to said real file object is managed by at least one virtual directory object in a hierarchical structure, said one virtual directory object being independent of said real directory object, wherein said virtual object management system includes:

(a) means, responsive to a demand for newly creating another virtual object including a virtual file object or a virtual directory object, for newly creating a real object including a real file object or a real directory object by utilizing said real object management system, and for producing a virtual object corresponding to said real object;

(b) means, responsive to a demand for duplicating a previously provided virtual object including a virtual file object or a virtual directory object, for duplicating that real object including a real file object or a real directory object which corresponds to said previously provided virtual object by utilizing said real object management system, and for producing a virtual object corresponding to said duplicated real object;

(c) means, responsive to a demand for sharing with a plurality of virtual objects, that said real object including a real file object or a real directory object which corresponds to a previously provided virtual object including a virtual file object or a virtual directory object, for creating at least one virtual object corresponding to said real object;

(d) first display means for defining icons of each of said virtual file objects and each of said virtual directory objects so as to display said icons on a window of a display screen;

(e) means, responsive to a selection of an icon made by a user for said icons being displayed, for judging whether said selected icon corresponds to said virtual directory object, or said virtual file object;

(f) second display means, responsive to a result of the judging that said selected icon corresponds to a virtual directory object, for displaying an icon corresponding to a virtual file object belonging to said judged virtual directory object on another window;

(g) means, responsive to a result of the judging that said selected icon corresponds to a virtual file object, for judging whether a real file object corresponding to said judged virtual file object corresponds to data, or a program;

(h) means, responsive to a result of the judging that said real file object corresponds to a data, for opening said corresponding real file object on a window; and (i) means, responsive to a result of the judging that said real file object corresponds to a program, for executing said corresponding real file object.

* * * * *

UNITED STATES PATENT AND TRADEMARK OFFICE
CERTIFICATE OF CORRECTION

PATENT NO. : 5,361,349
DATED : November 1, 1994
INVENTOR(S) : Yumiko Sugita, et al.

It is certified that error appears in the above-indentified patent and that said Letters Patent is hereby corrected as shown below:

Claim 1, column 12, line 61, delete "life" and substitute therefor --file--.

Signed and Sealed this

Tenth Day of January, 1995

BRUCE LEHMAN

*Attest:*

*Attesting Officer*  *Commissioner of Patents and Trademarks*